United States Patent
Yamaguchi et al.

(10) Patent No.: US 9,213,669 B2
(45) Date of Patent: Dec. 15, 2015

(54) TEST APPARATUS AND TEST METHOD

(71) Applicant: ADVANTEST CORPORATION, Tokyo (JP)

(72) Inventors: Takahiro Yamaguchi, Saitama (JP); Masahiro Ishida, Tokyo (JP)

(73) Assignee: ADVANTEST CORPORATION, Tokyo (JP)

(*) Notice: Subject to any disclaimer, the term of this patent is extended or adjusted under 35 U.S.C. 154(b) by 485 days.

(21) Appl. No.: 13/748,604

(22) Filed: Jan. 24, 2013

(65) Prior Publication Data
US 2014/0188436 A1    Jul. 3, 2014

(30) Foreign Application Priority Data
Dec. 28, 2012  (JP) .................. 2012-288633

(51) Int. Cl.
*G06F 11/00*   (2006.01)
*G06F 15/00*   (2006.01)
*G06F 11/263*  (2006.01)

(52) U.S. Cl.
CPC .............. *G06F 15/00* (2013.01); *G06F 11/263* (2013.01)

(58) Field of Classification Search
CPC .... H03F 1/3229; H03F 2200/451; H03F 3/24
USPC .................. 702/10, 117, 118, 182–185, 189
See application file for complete search history.

(56) References Cited

U.S. PATENT DOCUMENTS

2010/0271075 A1*  10/2010  Hagen ............................ 327/72

FOREIGN PATENT DOCUMENTS

| JP | H06-6227 A    | 1/1994 |
| JP | H11-237454 A  | 8/1999 |
| JP | 2005-221433 A | 8/2005 |

OTHER PUBLICATIONS

Office Action for Japanese Patent Application No. 2012-288633, issued by the Japanese Patent Office on Dec. 24, 2013.

* cited by examiner

*Primary Examiner* — Edward Raymond

(57) ABSTRACT

Provided is a test apparatus that tests a device under test, comprising a plurality of comparators that each receive a signal under measurement output by the device under test, have a common reference level set therein, and compare a signal level of the signal under measurement to the reference level; and a signal processing section that generates a single result signal based on the plurality of comparison results output by the comparators. Also provided is a test method using the test apparatus.

9 Claims, 8 Drawing Sheets

TEST APPARATUS AND TEST METHOD

BACKGROUND

1. Technical Field

The present invention relates to a test apparatus and a test method.

2. Related Art

As a conventional test apparatus for testing a device under test, an apparatus is known that includes a comparator for comparing the signal level of a signal under measurement output by the device under test to a prescribed reference level, as shown in Patent Document 1, for example.

Patent Document 1: Japanese Patent Application Publication No. H11-237454

The conventional test apparatus evaluates the signal under measurement based on 1-bit information output by the comparator. Therefore, the apparatus is sensitive to noise, timing jitter, or the like, and it is difficult to improve the measurement accuracy.

For example, the conventional test apparatus changes the timing of a strobe signal input to the comparator and detects the timing at which the logic value of the signal under measurement transitions. However, when noise, timing jitter, or the like is superimposed on the signal under measurement, incorrect detection of the logic value of the signal under measurement becomes more likely, and an incorrect timing for the transition of the logic value is detected.

SUMMARY

Therefore, it is an object of an aspect of the innovations herein to provide a test apparatus and a test method, which are capable of overcoming the above drawbacks accompanying the related art. The above and other objects can be achieved by combinations described in the claims. According to a first aspect of the present invention, provided is a test apparatus that tests a device under test, comprising a plurality of comparators that each receive a signal under measurement output by the device under test, have a common reference level set therein, and compare a signal level of the signal under measurement to the reference level; and a signal processing section that generates a single result signal based on the plurality of comparison results output by the comparators. Also provided is a test method using the test apparatus.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
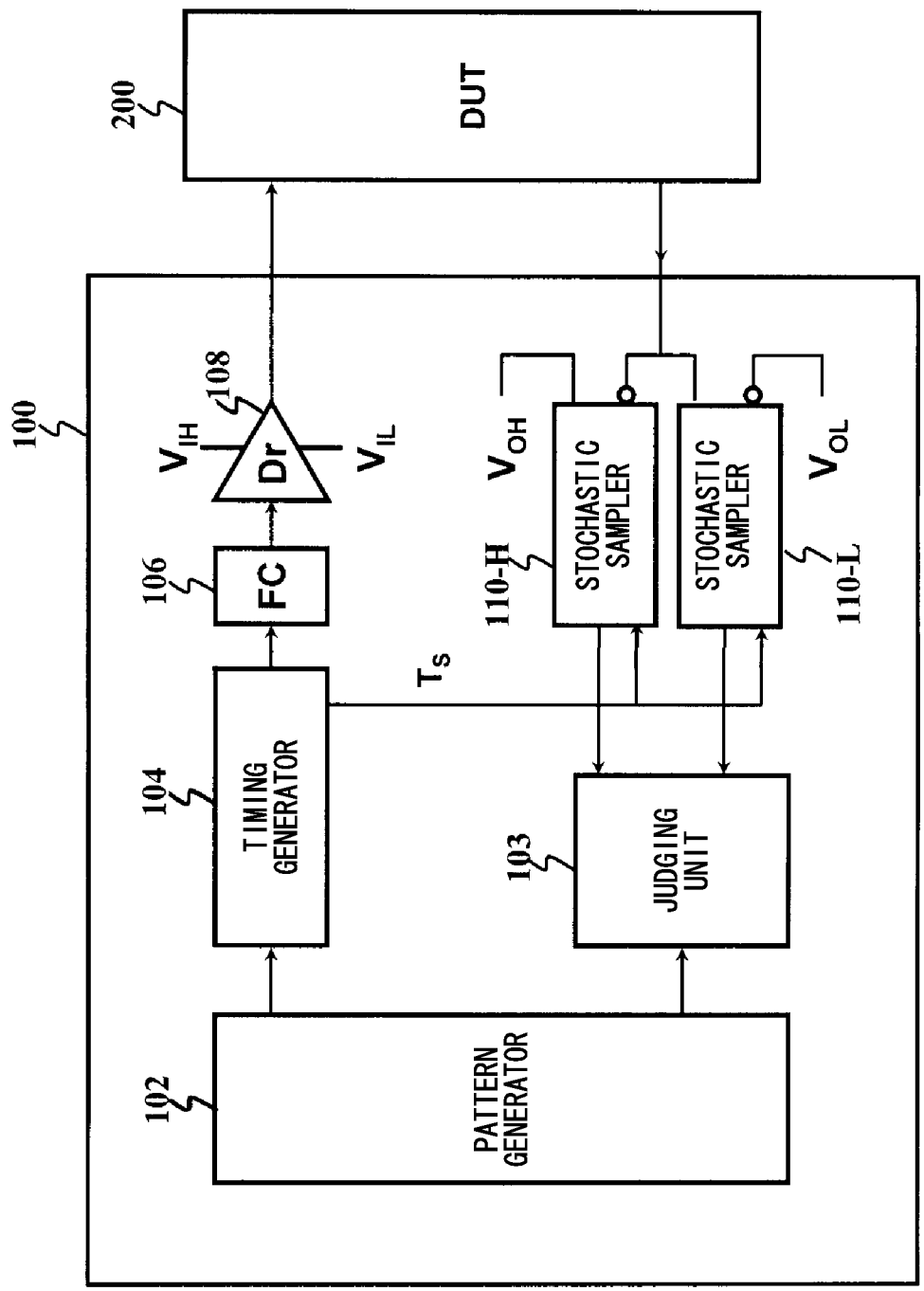
FIG. 1 shows an exemplary configuration of a test apparatus 100 that tests a device under test 200, such as a semiconductor chip.

FIG. 1 shows an exemplary configuration of a test apparatus 100 that tests a device under test 200, such as a semiconductor chip. The test apparatus 100 includes a pattern generator 102, a judging unit 103, a timing generator 104, a waveform shaper 106, a driver 108, and a stochastic sampler 110.

The pattern generator 102 generates a test pattern corresponding to a test program provided from a user, for example. The test pattern may define the logic pattern of the test signal to be input to the device under test 200, the period of the test signal, the phase of each edge of the test signal, or the like. The pattern generator 102 also generates an expected value signal that indicates a characteristic of the signal under measurement output by the device under test 200 in response to the test signal. For example, the expected value signal may indicate the logic pattern of the signal under measurement, the edge timing of the signal under measurement, or the like.

The timing generator 104 generates a pulse at a timing corresponding to the test pattern received from the pattern generator 102. For example, the timing generator 104 may generate a pulse indicating the timing at which the logic value of the test signal transitions from 0 to 1, and a pulse indicating the timing at which the logic value of the test signal transitions from 1 to 0.

The waveform shaper 106 shapes the waveform of the test signal according to the pulses received from the timing generator 104. For example, the waveform shaper 106 may include a set/reset latch that operates according to the pulses received from the timing generator 104.

The driver 108 inputs to the device under test 200 a voltage corresponding to the logic value of the waveform received from the waveform shaper 106. For example, the driver 108 may output a prescribed high voltage $V_{IH}$ for segments during which the logic value of the waveform is 1 and output a prescribed low voltage $V_{IL}$ for segments during which the logic value of the waveform is 0.

The stochastic sampler 110 receives the signal under measurement output by the device under test 200, and compares the signal level of the signal under measurement to a prescribed reference level. The test apparatus 100 of the present embodiment includes a stochastic sampler 110-H that is provided with the high reference level $V_{OH}$ and a stochastic sampler 110-L that is provided with the low reference level $V_{OL}$. Each stochastic sampler 110 receives the signal under measurement in parallel. The high reference level $V_{OH}$ and the low reference level $V_{OL}$ may be the same voltage.

The judging unit 103 judges pass/fail of the device under test 200 based on the comparison results of the stochastic samplers 110. The judging unit 103 may compare the logic pattern of the comparison results to the logic pattern of the expected value signal, or may compare characteristics of the signal under measurement derived from the comparison results to characteristics exhibited by the expected value signal.

Figure 2:
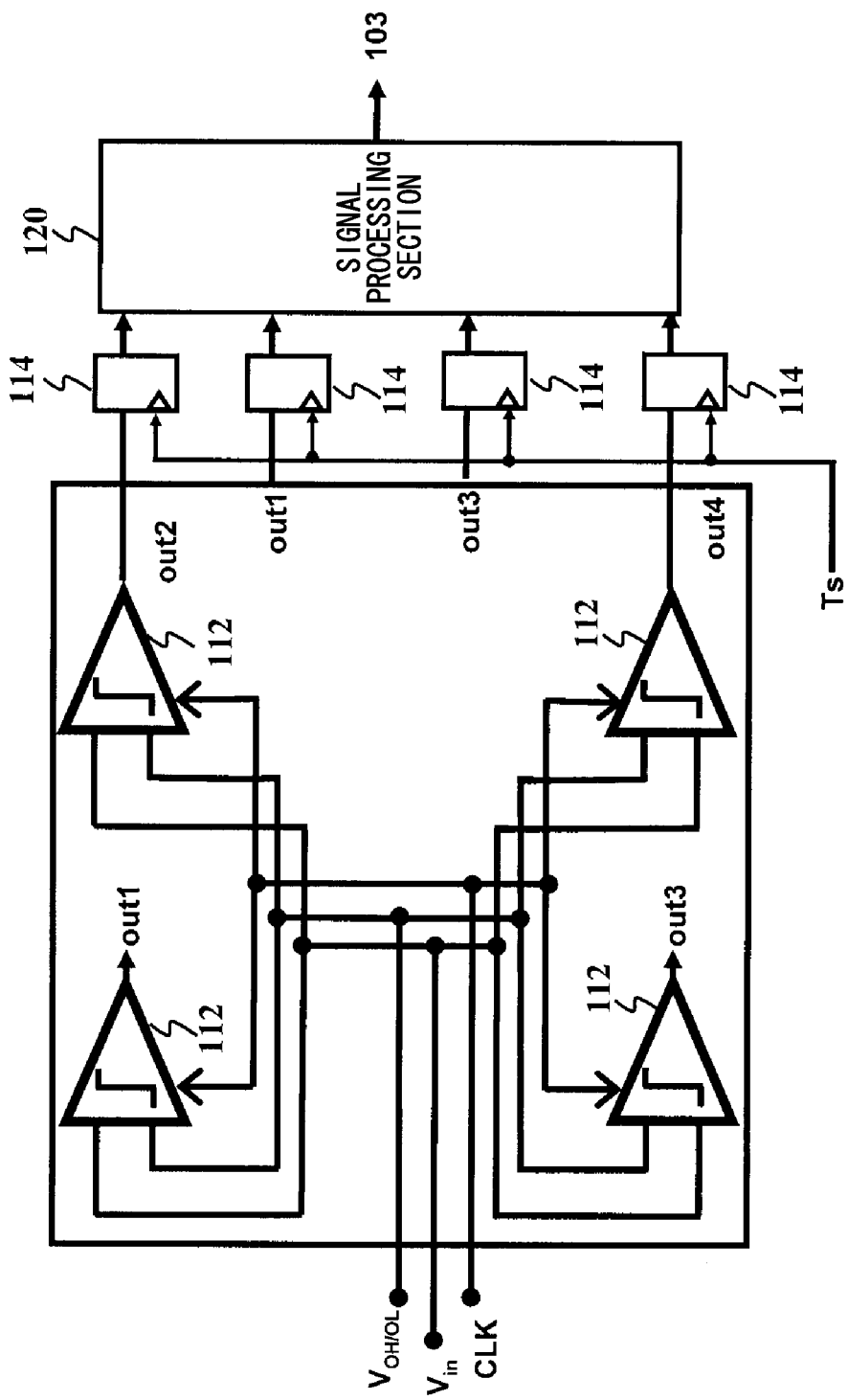
FIG. 2 shows an exemplary configuration of a stochastic sampler 110.

FIG. 2 shows an exemplary configuration of a stochastic sampler 110. The stochastic samplers 110-H and 110-L have the same configuration. The stochastic sampler 110 includes a plurality of comparators 112, a plurality of latch sections 114, and a signal processing section 120.

The comparators 112 each receive the signal under measurement, and are set with a common reference level $V_{OH}$ or $V_{OL}$. Each comparator 112 compares the signal level $V_{in}$ of the signal under measurement to the common reference level $V_{OH}$ or $V_{OL}$. Each comparator 112 in the present embodiment outputs a logic value of 1 when the signal level of the signal under measurement is greater than or equal to the reference level, and outputs a logic value of 0 when the signal level of the signal under measurement is less than the reference level. FIG. 2 shows an example in which the comparators 112 are clocked comparators, but the comparators 112 may instead be comparators that do not operate according to a clock. Each comparator 112 receives the signal under measurement, the reference level, and the clock on wires of equal length, such as in an H tree.

The latch sections 114 are provided to correspond respectively to the comparators 112. Each latch section 114 latches the signal output by the corresponding comparator 112 at the timing of a strobe signal input thereto. In other words, each latch section 114 outputs a digital value obtained by sampling the signal output by the corresponding comparator 112 at the timing of the strobe signal. The strobe signal is generated by the timing generator 104. The strobe signal in input to each latch section 114 through wires of equal length, such as in an H tree.

The signal processing section 120 generates one result signal based on the plurality of comparison results output by the comparators 112. The signal processing section 120 of the present embodiment performs digital signal processing on the digital values output by the latch sections 114.

For example, the signal processing section 120 may generate, as the result signal, an average value of the digital values output by the latch sections 114. As another example, the signal processing section 120 may generate a result signal indicating the number of latch sections 114 that output a prescribed logic value, e.g. a logic value of 1. As a further example, the signal processing section 120 may generate a result signal indicating the ratio of latch sections 114 that output a prescribed logic value.

The signal processing section 120 may also compare the result signal indicating the average value, number of latch sections 114, or ratio described above to a predetermined judgment value, to convert the above result signal into a logic pattern. For example, by converting the result signal value into a value of 1 when the result signal value is greater than the judgment value and into a value of 0 when the result signal value is less than the judgment value, the signal processing section 120 can convert the result signal into a logic pattern (instead, a value of 1 may be used when the result signal value is greater than the judgment value and value of 0 may be used when the result signal value is less than the judgment value). The judgment value may be less than 0.5 or greater than 0.5. The judgment value is preferably determined according to a characteristic of the signal under measurement or a characteristic of the stochastic sampler. For example, when a signal under measurement with a known characteristic, e.g. logic pattern, is input, the judgment value may be calibrated to be a value enabling the signal processing section 120 to correctly detect this logic pattern. The calibration is preferably performed for each stochastic sampler 110.

With the process described above, a single result signal including information concerning the comparison results of the comparators 112 can be generated. FIG. 2 shows an example in which there are four comparators 112, but the stochastic sampler 110 may instead include N comparators 112, where N is an integer greater than 2. For example, the stochastic sampler 110 may include 63 comparators 112. The present embodiment describes an example in which the result signal indicates the "number" of latch sections 114, but "average value," "number," and "ratio" can all be converted into equivalent information. Specifically, the "average value" can be obtained by multiplying the "number" by the value of the logic values and then dividing by N, and the "ratio" can be obtained by dividing the "number" by N.

Figure 3:
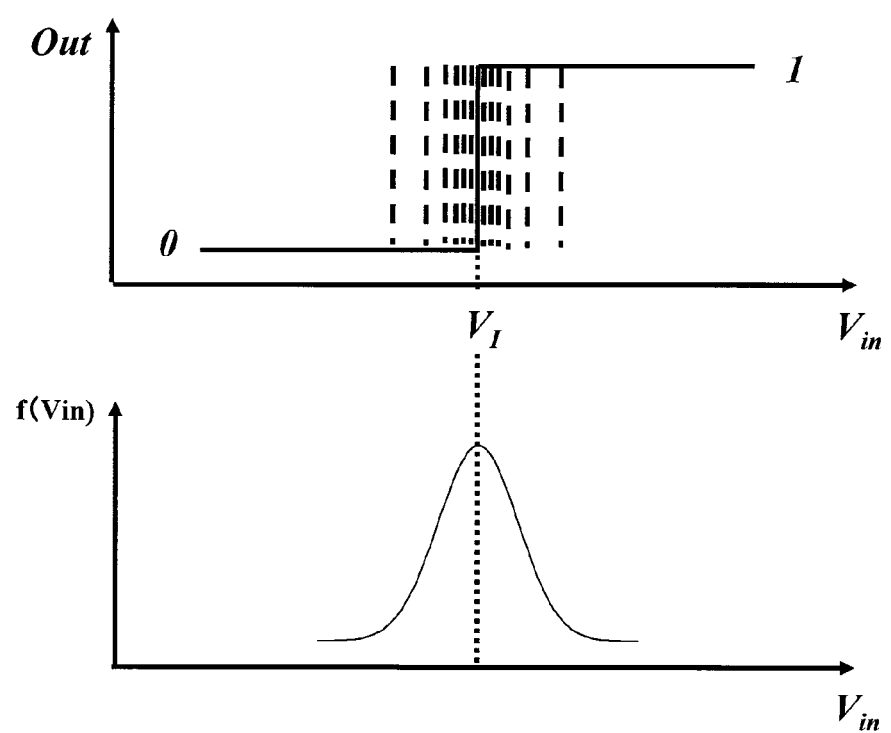
FIG. 3 is used to describe an exemplary operation of the comparators 112 in the stochastic sampler 110.

FIG. 3 is used to describe an exemplary operation of the comparators 112 in the stochastic sampler 110. In the upper portion of FIG. 3, the horizontal axis represents the signal level of the signal under measurement and the vertical axis represents the logic value output by the comparators 112. In a case where the comparators 112 are ideal, the logic values of all of the comparators 112 transition when the signal level of the signal under measurement crosses a voltage $V_1$ corresponding to the reference level. However, due to variation in the characteristics of the comparators 112, for example, there is a skew (offset) between the signal levels of the signal under measurement at which the logic values transition.

In the lower portion of FIG. 3, the horizontal axis represents the signal level of the signal under measurement and the vertical axis represents the probability density $f(V_{in})$ that the logic value output by a comparator 112 will transition. Here, $f(V_{in})$ indicates the ratio of comparators 112 whose logic values transition when the signal level of the signal under measurement is $V_{in}$, from among the plurality of comparators 112. Usually, the distribution of the offsets of the comparators 112 is Gaussian, as shown in FIG. 3.

Each comparator 112 is supplied with the signal under measurement and the clock through the equal-length wires. However, due to variation in the electrical length caused by process variation and timing fluctuation in the clock source, for example, the relative phases of the signal under measurement and the clock signal input to each comparator 112 are not exactly the same. This relative phase difference also follows a Gaussian distribution.

In this way, even if a common signal under measurement and reference level are input to the comparator 112, the characteristic variations of the comparators 112 or variation in electrical length cause variations in the signal level of the signal under measurement or in the timings at which the logic values input to the comparators 112 transition. Therefore, when one comparator 112 is used to compare the signal level of the signal under measurement to the reference level, it is difficult to perform an accurate comparison.

In response to this, the stochastic sampler 110 generates a result signal that combines the comparison results of the plurality of comparators 112. In other words, the result signal includes multi-bit information. Therefore, the signal under measurement can be more accurately compared to the reference level. For example, when the number of comparators 112 outputting a logic value of 1 is greater than or equal to a prescribed number, the logic value of the signal under measurement may be judged to be 1 at this timing.

Figure 4:
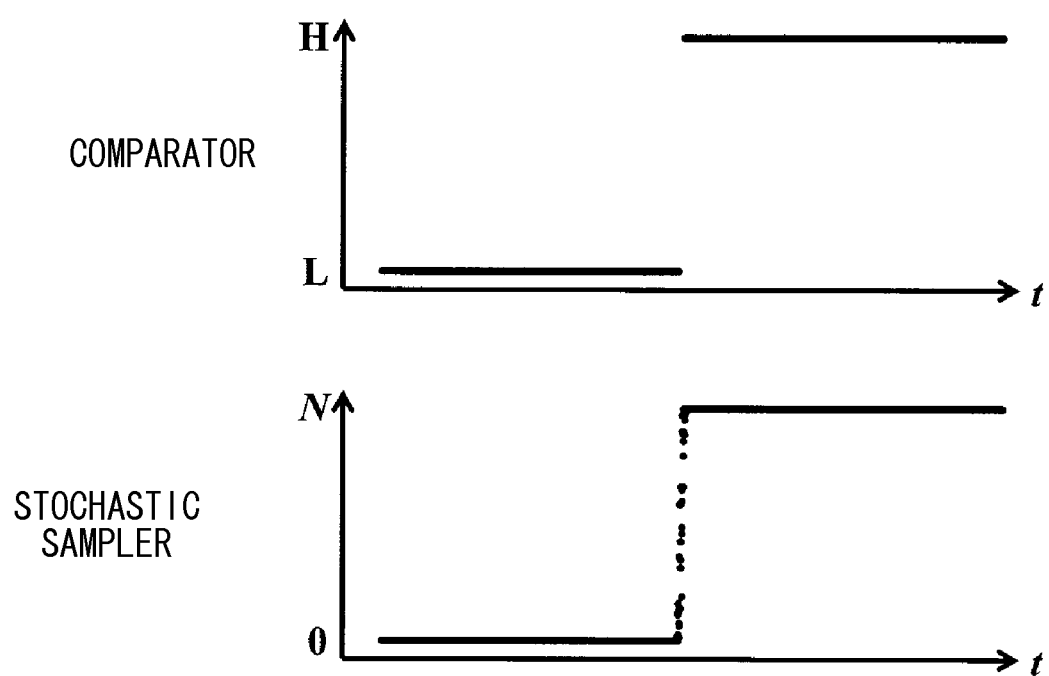
FIG. 4 is used to describe the difference in operation between a signal comparator and the stochastic sampler 110.

FIG. 4 is used to describe the difference in operation between a signal comparator and the stochastic sampler 110. In FIG. 4, the upper portion shows the operation of a single comparator, and the lower portion shows the operation of the stochastic sampler 110. FIG. 4 shows the output for a signal under measurement whose logic value transitions from 0 to 1 at a prescribed timing. As shown in the upper portion of FIG. 4, the output of the single comparator is 1-bit information that transitions between 0 and 1, and therefore has poor accuracy.

On the other hand, the result signal output by the stochastic sampler 110 of the present embodiment is $\log_2 N$-bit information that transitions between 0 and N. Therefore, as shown in the lower portion of FIG. 4, edge information can be obtained from a logic value of 0 to a logic value of N. The signal processing section 120 of the present embodiment detects, as the edge timing of the signal under measurement, the timing at which the output of the stochastic sampler 110 is N/2. The signal processing section detects the edge timing from the $\log_2 N$-bit information, and therefore can perform highly accurate measurement.

Figure 5:
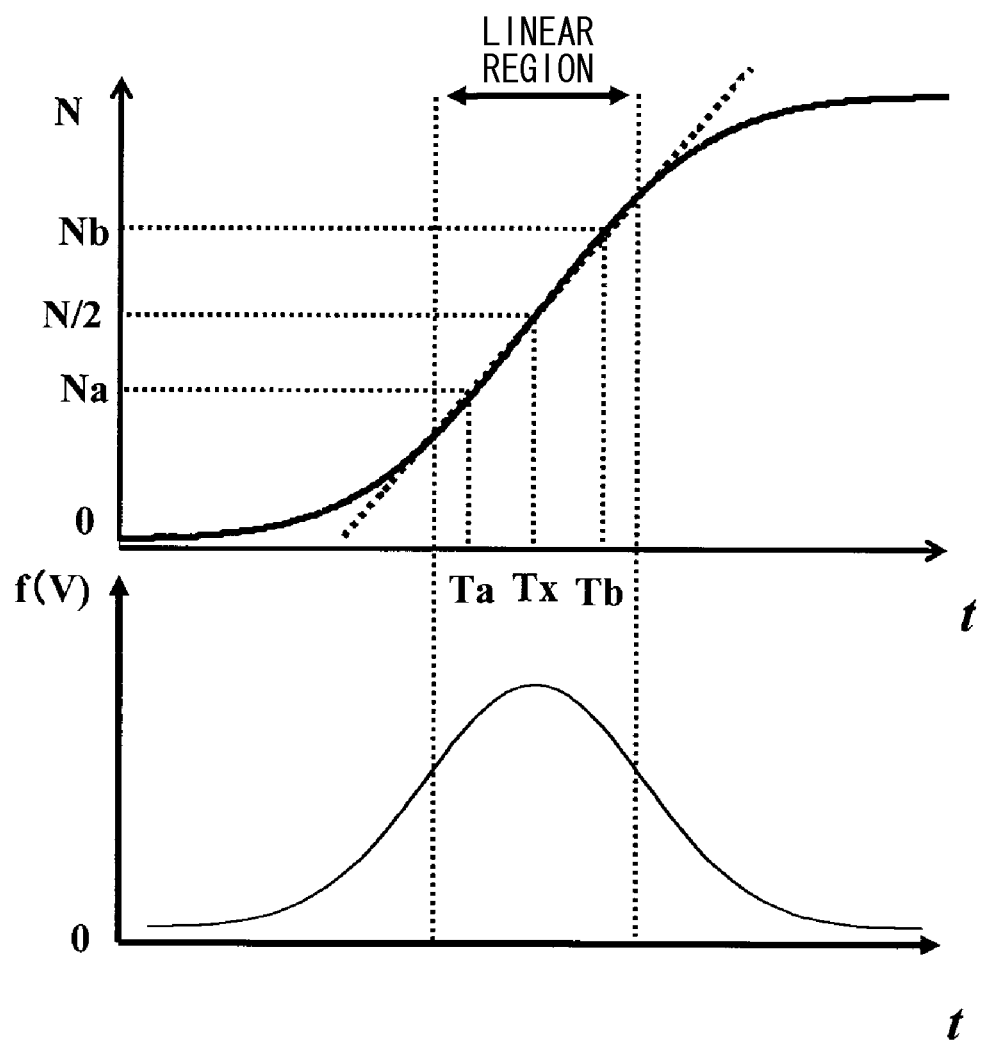
FIG. 5 is used to describe operation of the stochastic sampler 110 when a signal under measurement whose signal level gradually increases over time is input to the stochastic sampler 110.

FIG. 5 is used to describe operation of the stochastic sampler 110 when a signal under measurement whose signal level gradually increases over time is input to the stochastic sampler 110. In FIG. 5, the horizontal axis represents time. The vertical axis in the upper portion of FIG. 5 represents the value of the result signal output by the stochastic sampler 110, i.e. the number of comparison results indicating a logic value of 1, and the vertical axis in the lower portion of FIG. 5 represents the probability density function of the timings at which the logic values output by the comparators 112 transition. Furthermore, the probability density function in the lower portion of FIG. 5 is a Gaussian distribution having a standard deviation that corresponds to the slope of the signal level change of the signal under measurement.

The cumulative distribution function shown in the upper portion of FIG. 5 corresponds to an edge of the result signal between an output value of 0 and an output value of N, as shown in the lower portion of FIG. 4. As described above, the signal processing section 120 detects, as the edge timing of the signal under measurement, a timing Tx at which the output of the stochastic sampler 110 is N/2. In this way, the edge timing can be accurately detected.

Since the output of the stochastic sampler 110 is $\log_2 N$-bit information transitioning between 0 and N, the timing Tx at which the output of the stochastic sampler 110 becomes N/2 can be accurately detected by performing interpolation between the two timings Ta and Tb at which the output of the stochastic sampler 110 is respectively Na and Nb. For example, the signal processing section 120 may calculate the timing Tx at which the output of the stochastic sampler 110 is N/2 by calculating the straight line passing through the two points (Na, Ta) and (Nb, Tb).

The sample points used in the interpolation are preferably points within a range of a prescribed linear region. The cumulative distribution function shown in the upper portion of FIG. 5 is equivalent to the integral of the probability density function shown in the lower portion of FIG. 5. As described above, since the probability density function is a Gaussian distribution, the change in the probability density near the average value of the distribution is relatively low. Therefore, in the upper portion of FIG. 5, near the average value of the probability density function, there is a linear region in which the cumulative distribution function is almost linear.

The signal processing section 120 may perform the above interpolation under a condition that the two sampled points are within this linear region. The linear region may be a range of $\pm 0.5\sigma$ or $\pm \sigma$ centered on the average value $\mu$ in the probability density function. As another example, the linear range may be a range of $\pm 0.5\sigma$ or $\pm \sigma$ centered on the timing at which the number of comparison results indicating a prescribed logic value, e.g. a logic value of 1, is N/2, from among the comparison results of the comparators 112. The judging unit 103 may evaluate the device under test 200 based on whether the edge timing detected by the signal processing section 120 is within the prescribed range. With this configuration, the device under test 200 can be accurately evaluated. Furthermore, the linear range may be changed according to the slope of the edge or the like of the signal under measurement. For example, the linear range can be made wider when the edge slope is greater.

Figure 6:
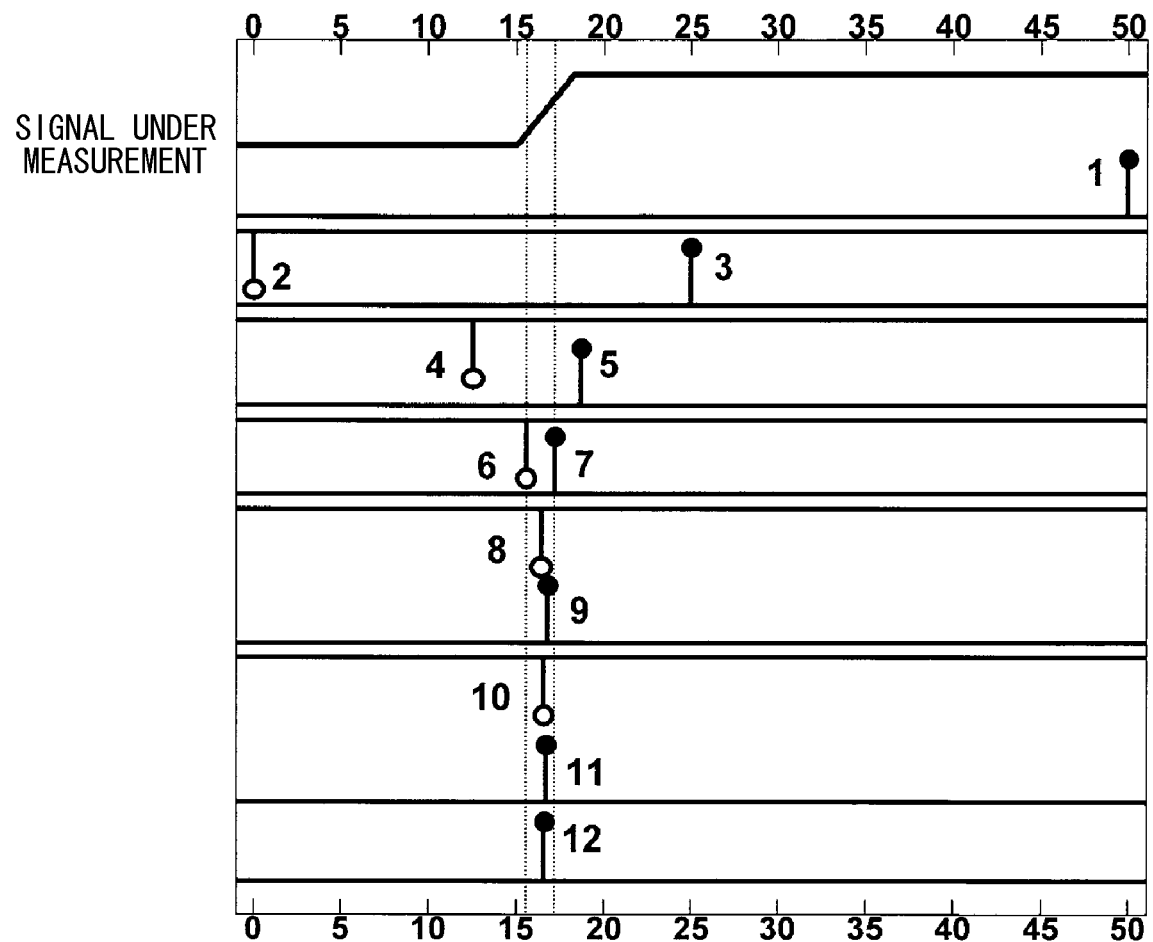
FIG. 6 is used to describe a method for detecting the edge timing of the signal under measurement by using a binary search.

FIG. 6 is used to describe a method for detecting the edge timing of the signal under measurement by using a binary search. The binary search is a method for detecting a target, which is a new search point that is a midpoint between two immediately prior search points. In general, the test apparatus sequentially detects logic values of the signal under measurement at search points 1, 2, etc., as shown in FIG. 6.

Usually, the timing of the edge of the signal under measurement is unknown, and therefore the first two search points 1 and 2 are set to include a sufficiently large range. In the example of FIG. 6, the logic value of the signal under measurement is 1 at search point 1 and is 0 at search point 2, and therefore it is known that the edge of the signal under measurement is between search points 1 and 2. Next, the midpoint between search points 1 and 2 is set as search point 3. The logic value of the signal under measurement at search point 3 is 1, and therefore it is known that the edge of the signal under measurement is between search points 2 and 3. Next, the midpoint between search points 2 and 3 is set as search point 4. This process is repeated until the distance between the two search points is less than the measurement resolution. In this way, the edge timing of the signal under measurement can be accurately detected.

The test apparatus 100 can perform the binary search described above using the stochastic sampler 110. At this time, by using the interpolation described above, the edge timing can be detected more quickly.

The test apparatus 100 measures the signal under measurement using the stochastic sampler 110. For example, at timings sufficiently separated from the edge of the signal under measurement, such as search points 1 and 2 in FIG. 6, the value of the result signal output by the stochastic sampler 110 is either N or 0. However, when the search points become closer to the edge of signal under measurement, the value of the result signal output by the stochastic sampler 110 is between N and 0.

Figure 7:
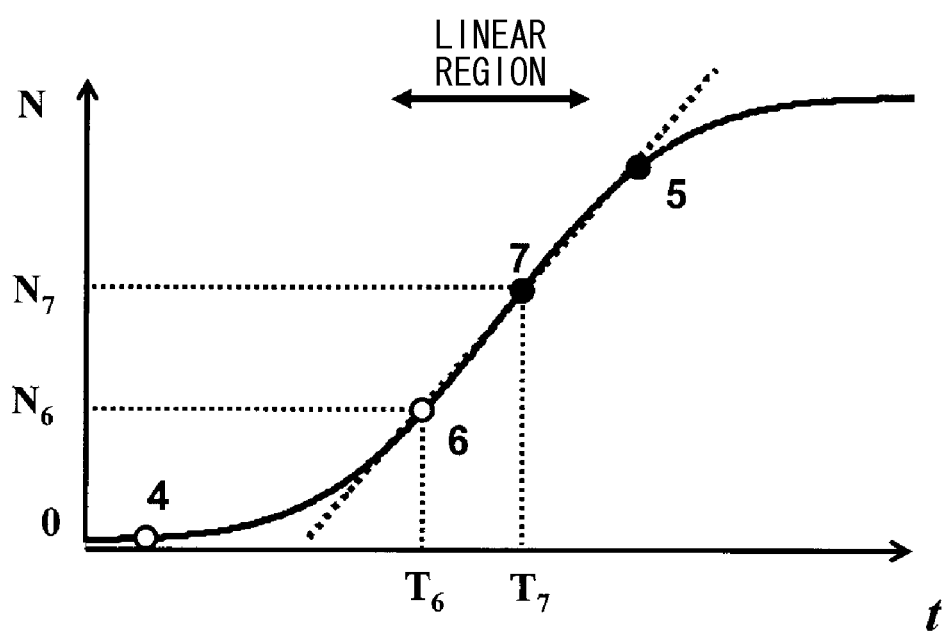
FIG. 7 is used to describe an exemplary operation of the test apparatus 100 performing the binary search.

FIG. 7 is used to describe an exemplary operation of the test apparatus 100 performing the binary search. For example, the value of the result signal at search point 5 is less than N. When the timing of the search point becomes closer to the edge timing, the value of the result signal approaches N/2, which indicates the edge position. For example, the value of the result signal at search points 6 and 7 is within the linear region near N/2. The signal processing section 120 ends the search on a condition that the value of the result signal at two search points is within the range of the predetermined linear region. The edge timing is then detected by performing an interpolation between the two points $(N_6, T_6)$ and $(N_7, T_7)$ detected at the two immediately prior search points. With this process, the edge timing can be detected accurately and quickly. Furthermore, the edge timing can be detected with a resolution higher than the resolution set for the search points (strobe timing).

Figure 8:
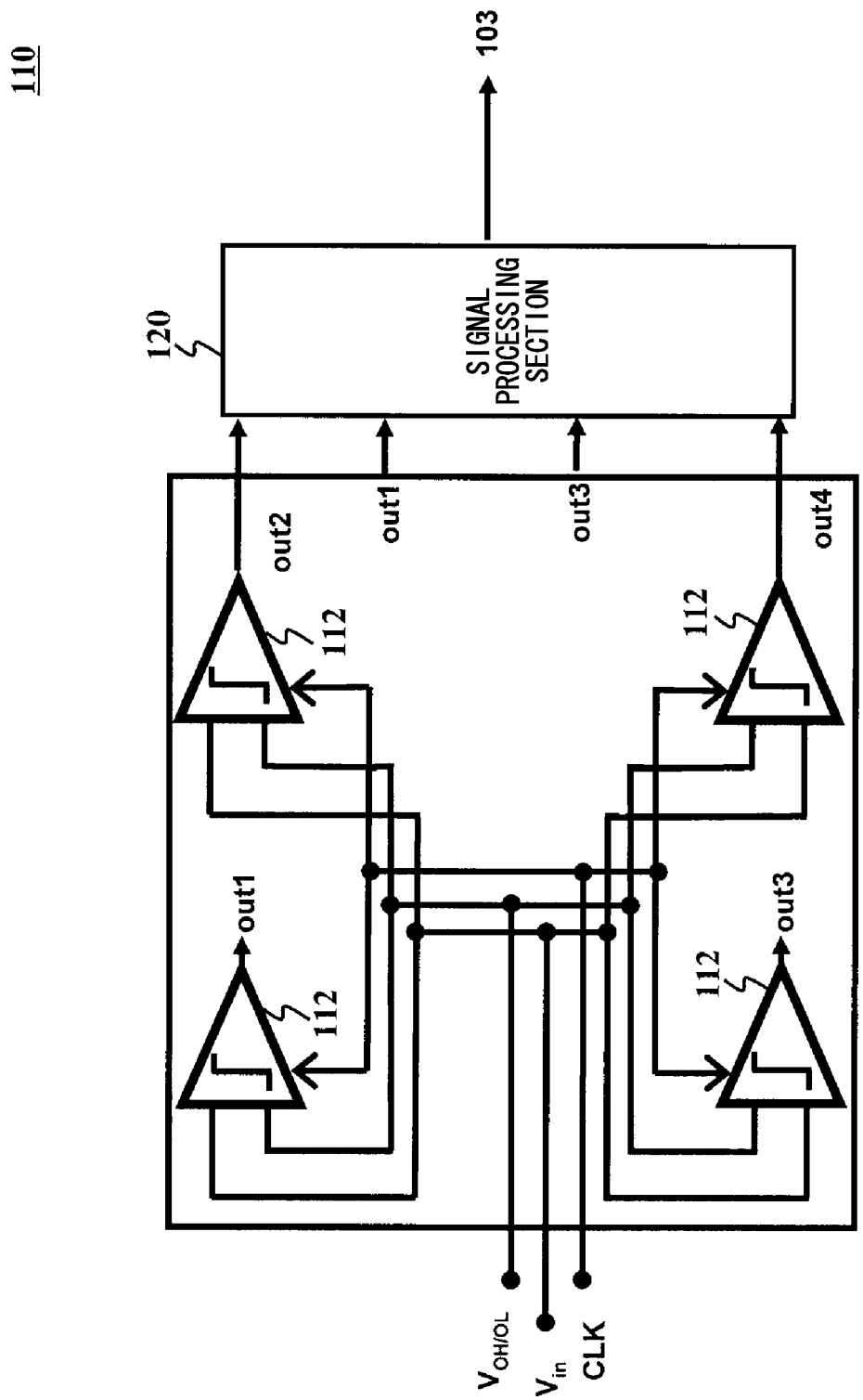
FIG. 8 shows another exemplary configuration of the stochastic sampler 110.

FIG. 8 shows another exemplary configuration of the stochastic sampler 110. The stochastic sampler 110 of the present embodiment differs from the configuration shown in FIG. 2 by not including latch sections 114. The stochastic sampler 110 of the present embodiment may include latch sections within the signal processing section 120.

The signal processing section 120 of the present embodiment receives the comparison results output by the comparators 112. The signal processing section 120 performs analog signal processing on the received comparison results. For example, the signal processing section 120 may receive the comparison result signals output by the comparators 112 and generate a result signal that has the average signal level of the received signals. The signal processing section 120 includes z latch section for converting the result signal into a digital signal. The signal processing section 120 detects the edge timing and logic value, for example, of the signal under measurement based on the result signal output by the latch section.

The signal processing section 120 shown in FIG. 2 or FIG. 8 may output, as the result signal, a comparison result of the comparator 112 that most quickly outputs a predetermined comparison result. For example, the signal processing section 120 may output, as the result signal, the comparison result of the comparator 112 that most quickly detects the transition of a signal under measurement whose logic value transitions from 0 to 1. In this way, the response speed of the test apparatus 100 can be improved and the testing speed can be improved when detecting an edge of the signal under measurement. Furthermore, the signal processing section 120 may output, as the result signal, comparison results of the comparators 112 at a time when the number of comparators 112 that output the comparison result is a prescribed number less than N/2, e.g. two or three comparators 112.

Generally, the response delay of a comparators is larger when the level of the input signal is closer to the reference level. By selecting the comparator 112 with the shortest response delay from among the comparators 112, a decrease in testing efficiency due to response delay of the comparators can be prevented.

In the exemplary configuration of FIG. 2, the clock is distributed through equal-length wires to the plurality of comparators 112 within a single stochastic sampler 110. As another example, the clock may be distributed through wires of different lengths to the comparators 112. By creating skew between the clocks provided to the comparators 112, the distribution range of the probability density shown in FIG. 5 can be increased. Furthermore, a variable delay circuit may be provided in each transmission path through which the clock is provided to the comparators 112 to intentionally inject jitter.

The stochastic sampler 110 can detect the logic value of the signal under measurement based on the value of the result signal. For example, the stochastic sampler 110 converts the result signal to a logic value of 1 when the result signal is greater than or equal to a prescribed value, and converts the result signal to a logic value of 0 when the result signal is less than the prescribed value. In this way, the logic value pattern of the signal under measurement can be detected. The judging unit 103 compares this logic value pattern to the logic value pattern of an expected value signal. In this way, function testing of the device under test 200 can be performed.

The test apparatus 100 may judge whether the edge timing of the signal under measurement is within a prescribed range. For example, the test apparatus 100 may supply the stochastic sampler 110 with strobe signals having timings at the upper limit and lower limit of this prescribed range. The signal processing section 120 detects the logic value of the signal under measurement at the upper limit and lower limit strobe timings, based on the result signal at the lower limit and upper limit strobe timings. If the logic value detected at the lower limit and upper limit strobe timing transitions, it can be judged that the edge timing of the signal under measurement is within the prescribed range.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A test apparatus that tests a device under test, comprising:
   a plurality of comparators that each receive, at a common first input, a common signal under measurement output by the device under test and, at a common second input, a common reference level and compare a signal level of the signal under measurement to the reference level; and
   a signal processing section that receives a plurality of comparison results output by the comparators and generates a single result signal based on the plurality of comparison results output by the comparators.

2. A test apparatus that tests a device under test, comprising:
   a plurality of comparators that each receive a signal under measurement output by the device under test, have a common reference level set therein, and compare a signal level of the signal under measurement to the reference level; and
   a signal processing section that generates a single result signal based on the plurality of comparison results output by the comparators, wherein
   the signal processing section generates the result signal by averaging the comparison results output by the comparators.

3. The test apparatus according to claim 1, wherein the signal processing section generates the result signal to indicate the number of comparators that output a comparison result that matches a predetermined logic value.

4. The test apparatus according to claim 2, wherein the signal processing section performs an interpolation in the result signal that changes over time.

5. The test apparatus according to claim 1, wherein the signal processing section outputs, as the result signal, a comparison result of a comparator that most quickly outputs a predetermined comparison result among the comparators.

6. The test apparatus according to claim 1, wherein the signal processing section generates the result signal by performing analog signal processing on the comparison results output by the comparators, converts the result signal into a digital signal, and outputs the digital signal.

7. The test apparatus according to claim 1, further comprising a latch section that converts the comparison results of the comparators into a digital signal, wherein the signal processing section generates the result signal based on the comparison results of the comparators that have been converted into the digital signal.

8. The test apparatus according to claim 1, wherein
the signal processing section detects a timing at which a logic value of the signal under measurement transitions, based on a timing at which a value of the result signal matches a predetermined value.

9. A method for testing a device under test, comprising:
generating a single result signal based on a plurality of comparison results output by a plurality of comparators that each receive, at a common first input, a common signal under measurement output by the device under test and, at a common second input, a common reference level, and compare a signal level of the signal under measurement to the reference level; and
judging pass/fail of the device under test based on the result signal.

\* \* \* \* \*